United States Patent
Karpinsky et al.

(10) Patent No.: US 11,142,409 B1
(45) Date of Patent: Oct. 12, 2021

(54) CONVEYOR SYSTEM WITH ORIENTATION OF CONVEYED FOOD PRODUCTS

(71) Applicant: Vibratory Solutions, LLC, Lodi, WI (US)

(72) Inventors: James L. Karpinsky, Madison, WI (US); James Martin Bakos, Gig Harbor, WA (US); Scott Jay Paul Rose, Columbus, WI (US); Bradley Charles Slepicka, Portage, WI (US)

(73) Assignee: Vibratory Solutions, LLC, Lodi, WI (US)

( * ) Notice: Subject to any disclaimer, the term of this patent is extended or adjusted under 35 U.S.C. 154(b) by 0 days.

(21) Appl. No.: 16/859,185

(22) Filed: Apr. 27, 2020

(51) Int. Cl.
*B65G 47/74* (2006.01)
*B65G 27/04* (2006.01)
*B65G 27/08* (2006.01)

(52) U.S. Cl.
CPC ............ *B65G 47/74* (2013.01); *B65G 27/04* (2013.01); *B65G 27/08* (2013.01)

(58) Field of Classification Search
None
See application file for complete search history.

(56) References Cited

U.S. PATENT DOCUMENTS

| | | |
|---|---|---|
| 3,547,075 A | 12/1970 | Johnson |
| 3,860,105 A | 1/1975 | Johnson |
| 3,929,221 A * | 12/1975 | Armstrong .......... B65H 5/008 198/771 |
| 4,058,083 A | 11/1977 | Miller |
| 4,351,850 A | 9/1982 | Costamagna et al. |
| 4,496,084 A | 1/1985 | Booth et al. |
| 5,037,536 A | 8/1991 | Koch et al. |
| 5,238,303 A | 8/1993 | Dixon |
| 5,314,056 A | 5/1994 | Davis et al. |
| 5,437,723 A | 8/1995 | Sollich |
| 5,555,967 A | 9/1996 | Hufford |
| 6,276,518 B1 | 8/2001 | Wierman |
| 6,286,658 B1 | 9/2001 | Hufford |
| 6,308,822 B1 | 10/2001 | Moran et al. |
| 6,406,680 B1 | 6/2002 | Priebe |
| 6,505,547 B1 | 1/2003 | Burnett et al. |
| 6,655,523 B2 | 12/2003 | Jones et al. |
| 6,868,960 B2 | 3/2005 | Jones |
| 7,475,767 B2 | 1/2009 | Crawford et al. |
| 7,703,411 B1 | 4/2010 | Bakos et al. |
| 7,757,836 B2 | 7/2010 | Karpinsky et al. |
| 7,775,343 B2 | 8/2010 | Kemph et al. |

(Continued)

*Primary Examiner* — Kavel Singh
(74) *Attorney, Agent, or Firm* — Craig A. Fieschko, Esq.; DeWitt LLP

(57) ABSTRACT

A vibratory conveyor system includes two or more product transfer pans bearing lengthwise channels along which products travel, each pan being linked to a respective shaker base via respective spring arms. Successive product transfer pans each have one or more of (1) greater vibration distance oriented along the direction of product travel, (2) greater vibrational frequency/speed, and/or (2) lesser spring arm angle with respect to vertical, than the prior product transfer pan(s). These features assist with obtaining a high degree of uniform product alignment, with products being aligned lengthwise within the channels of the pans, even where products are non-rigid and malleable/reshapeable (for example, for meat cutlets and fish fillets).

20 Claims, 2 Drawing Sheets

(56) References Cited

U.S. PATENT DOCUMENTS

| | | | |
|---|---|---|---|
| 7,842,896 | B1 | 11/2010 | Calcoen et al. |
| 7,874,081 | B2 | 1/2011 | Ewen |
| 8,181,592 | B2 | 5/2012 | Karpinsky et al. |
| 8,283,589 | B2 | 10/2012 | Janssens et al. |
| 8,359,995 | B2 | 1/2013 | Bakos et al. |
| 8,517,168 | B2 | 8/2013 | Hufford |
| 8,708,153 | B2 | 4/2014 | Hufford et al. |
| 8,714,362 | B2 | 5/2014 | Jones et al. |
| 8,733,540 | B2 | 5/2014 | Woiler et al. |
| 8,789,706 | B2 * | 7/2014 | Pandraud ................ B65G 27/04 209/320 |
| 9,126,765 | B2 | 9/2015 | Groenewald et al. |
| 9,132,966 | B1 | 9/2015 | Groenewald et al. |
| 9,181,037 | B1 | 11/2015 | Tomlinson et al. |
| 9,254,965 | B2 | 2/2016 | Groenewald |
| 9,277,754 | B2 | 3/2016 | Karpinsky et al. |
| 9,370,197 | B1 | 6/2016 | Karpinsky et al. |
| 9,408,283 | B2 | 8/2016 | Jones et al. |
| 9,415,941 | B2 | 8/2016 | Woiler et al. |
| 9,463,935 | B1 | 10/2016 | Karpinsky et al. |
| 9,481,525 | B1 | 11/2016 | Dunham et al. |
| 9,481,526 | B1 | 11/2016 | Groenewald |
| 9,635,880 | B2 | 5/2017 | Bakos et al. |
| 9,776,805 | B2 | 10/2017 | Groenewald |
| 9,889,993 | B2 * | 2/2018 | Abbas ..................... A23L 19/18 |
| 10,011,426 | B1 | 7/2018 | Karpinsky et al. |
| 10,815,064 | B1 * | 10/2020 | Ahmed .................. B65G 27/04 |
| 2013/0146512 | A1 * | 6/2013 | Reynolds .................. B07C 5/10 209/539 |

* cited by examiner

CONVEYOR SYSTEM WITH ORIENTATION OF CONVEYED FOOD PRODUCTS

FIELD OF THE INVENTION

This document concerns an invention relating generally to automated orientation of food products, particularly malleable/reshapable food products such as chicken cutlets, during processing so that the products have identical (or at least more similar) alignment.

BACKGROUND OF THE INVENTION

Automated preparation and packaging of food products which are malleable—such as battered/breaded fish fillets and chicken cutlets—is challenging. For uniform treatment and ease of processing, the products are ideally spaced apart and uniformly oriented as they travel through processing equipment, for example, so that all products are oriented with lengths parallel to the direction of travel through the processing equipment. Methods used to uniformly orient other types of food products are largely unsuitable because malleable food products can have nonuniform shapes, are reshapeable, and are prone to sticking to each other and/or to processing equipment. Additional complications arise where the processing of these products involves steps that further randomize their orientation. As an example, a popular form of chicken product is a "family style" or "country style" cutlet which has a coarse and heavy particulate coating on the cutlet (the coating being in the nature of coarse breadcrumbs or cracker crumbles). The coating is typically applied by tumbling the cutlets within a rotating drum containing the coating particles, with the cutlets being lifted, dropped, and rolled within the drum (and in and on the coating particles within the drum). The coated cutlets are then discharged from the drum for further processing (e.g., further coating, frying, freezing, and/or packaging). To reduce production difficulties (in particular, unsuitable "reject" cutlets), the coated cutlets are ideally spaced and uniformly oriented during such further processing. However, the tumbling process negates any uniformity, with the cutlets exiting the drum in random orientations (and possibly being stuck in folded states, or being stuck to other cutlets). As a result, personnel are often required to monitor, unstick, and orient the cutlets for further processing. While this reduces or eliminates product rejects, it tends to increase production costs.

SUMMARY OF THE INVENTION

The invention involves a conveyor system which is intended to at least partially address the aforementioned problems. To give the reader a basic understanding of some of the advantageous features of the invention, following is a brief summary of preferred versions of the conveyor system, with reference being made to the accompanying drawings (which are briefly reviewed in the following "Brief Description of the Drawings" section of this document) to assist the reader's understanding. Since the following discussion is merely a summary, it should be understood that more details regarding the preferred versions may be found in the Detailed Description set forth elsewhere in this document. The claims set forth at the end of this document then define the various versions of the invention in which exclusive rights are secured.

The accompanying FIGS. 1-2 illustrate a conveyor system 10 exemplifying the invention. The conveyor system 10 includes several product transfer pans 100/200/300 arrayed in series, with each product transfer pan being linked by elongated spring arms 102/202/302 (FIG. 2) to a respective shaker motor 104/204/304. (Each product transfer 100/200/300 pan here includes three pan sections, respectively 100*a*, 100*b*, 100*c*; 200*a*, 200*b*, 200*c*; and 300*a*, 300*b*, 300*c*. As discussed below, each product transfer pan may include fewer or more pan sections.) The shaker motors 104/204/304, which may be conventional rotary electric motors whose shafts bear rotating imbalances, impart vibration to the spring arms 102/202/302 such that their lengths vibrate, causing the spring arm ends linked to the transfer pans 100/200/300 to vibrate along directions perpendicular to the spring arm lengths. The product transfer pans 100/200/300 therefore likewise vibrate, with their movement having both a horizontal component (moving along a vibration distance oriented along the length of the conveyor system 10) and a vertical component (moving along a vibration height oriented perpendicular to the length of the conveyor system 10). Product placed on the product transfer pans 100/200/300 is then conveyed along the pans 100/200/300 in a "bouncing" motion by this vibration (primarily by its horizontal component), as well as by any inclination of the product transfer pans 100/200/300. Each product transfer pan 100/200/300 extends between a pan input end 100*i*/200*i*/300*i* and a pan output end 100*o*/200*o*/300*o*, wherein each pan input end is situated to receive product from the pan output end of any prior product transfer pan in the series (as by having each pan's output end situated above and overhanging the input end of any succeeding pan). Thus, product deposited on the first product transfer pan 100 (e.g., from a drum coater) is conveyed along the first pan 100 to be deposited onto the second pan 200, then conveyed along the second pan 200 to be deposited on the third pan 300, and then conveyed along the third pan 300 to be received by subsequent processing equipment.

Each product transfer pan 100/200/300 includes product channels 106/206/306 depressed therein, with the product channels extending between the pan input end 100*i*/200*i*/300*i* and the pan output end 100*o*/200*o*/300*o*. In the depicted exemplary conveyor system 10, the product transfer pans 100/200/300 are corrugated, having V-shaped channels 106/206/306 with inclined walls. As product is conveyed along each pan 100/200/300 by the vibration, over time, the vibration tends to settle products into the channels 106/206/306 with the lengths of the products aligned along the lengths of the channels. The products may be given more residence time on each product transfer pan 100/200/300, and thus more time to settle into the channels 106/206/306, if the pans 100/200/300 (and/or the pan sections 100*a*, 100*b*, 100*c*/200*a*, 200*b*, 200*c*/300*a*, 300*b*, 300*c* therein) slope upwardly between their pan input ends 100*i*/200*i*/300*i* and their pan output ends 100*o*/200*o*/300*o*, whereby each pan's output end is higher than its input end. The product is additionally spread across the width of the conveyor system 10 as it travels along the conveyor system 10 by providing successive product transfer pans 100/200/300 with greater numbers of channels 106/206/306; for example, the second product transfer pan 200 of the exemplary conveyor system 10 is provided with twice as many channels 206 as the first product transfer pan 100, whereby products traveling down a channel 106 of the first pan 100 tend to be distributed between the succeeding two channels 206 of the second pan 200.

In this arrangement, some products may still fail to align their lengths along the lengths of the channels 106/206/306. For example, a chicken cutlet deposited on the input end 100*i* of the first product transfer pan 100 with its length oriented perpendicular to the channels 106 may sag into two or more adjacent channels 106, resisting alignment as it travels along the conveyor system 10. This problem can be reduced, and more uniform product alignment can be achieved, if each succeeding product transfer pan in the series has one or more of:

(1) A vibration distance (that is, the amount of oscillation along the direction of product travel) greater than the vibration distance of the prior product transfer pan in the series. This feature can be provided by having the spring arms 102/202/302 (FIG. 2) of each successive product transfer pan 100/200/300 aligned at a lesser angle to a vertical plane than the prior product transfer pan, thereby increasing the vibration distance (the horizontal component of vibratory movement) and decreasing the vibration height (the vertical component of the vibratory movement) in successive pans 100/200/300.

(2) A vibration frequency greater than the vibration frequency of the prior product transfer pans in the series 100/200/300. This feature can be provided by having the shaker motor 104/204/304 of each successive product transfer pan 100/200/300 operate at a greater speed than the shaker motor 104/204/304 of the prior product transfer pan 100/200/300 in the series.

By having a succeeding product transfer pan 100/200/300 vibrate with a greater vibration distance than the prior pan 100/200/300, and/or with a greater vibration frequency than the prior pan 100/200/300, the succeeding pan 100/200/300 accelerates products as they transition from the prior pan 100/200/300 to the succeeding pan 100/200/300. The portion of each product that initially falls on the succeeding pan 100/200/300 is therefore more forcefully thrust forwardly than the trailing portion of the product, an effect which tends to pull products so that their lengths are oriented more parallel to the product.

By providing a conveyor system 10 having two or more product transfer pans 100/200/300 (and preferably three or more product transfer pans 100/200/300) as described above, products tend to have their lengths orient more parallel to the product travel direction (along the length of the conveyor system 10) as they travel along and between the product transfer pans 100/200/300. The products then leave the final product transfer pan 300 with the same (or at least similar) orientations, and with greater lateral distribution spread across the width of the final product transfer pan 300 than on the first product transfer pan 100, for further processing on any subsequent processing equipment.

Further potential advantages, features, and objectives of the invention will be apparent from the remainder of this document in conjunction with the associated drawings.

DETAILED DESCRIPTION OF EXEMPLARY VERSIONS OF THE INVENTION

Expanding on the foregoing discussion, each of the product transport pans 100/200/300 of the conveyor system 10 has relatively light weight, and can be formed of corrugated sheet metal or plastic (with stainless steel being preferred for food processing applications). Each product transfer pan 100/200/300 is mounted in a respective frame 108/208/308 having sides which rise above the product transfer pan 100/200/300, with the frame 108/208/308 being resiliently linked by spring arms 102/202/302 (FIG. 2, e.g., leaf/beam springs) to a relatively heavy shaker base 110/210/310 bearing the shaker motor 104/204/304. As the shaker motor 104/204/304 vibrates the shaker base 110/210/310, the vibration is transmitted to its product transport pan 100/200/300 via the intervening spring arms 102/202/302, which sway about their lengths, and thus provide "thrust" to their frames 108/208/308 (and the product transfer pans 100/200/300 thereon) along vectors oriented perpendicular to their lengths. A product situated on a product transport pan 100/200/300 essentially "bounces" across the pan in accordance with the thrust imparted to the pan, and any inclination of the pan. Examples of conveyor systems of this nature can be found in U.S. Pat. No. 7,703,411 to Bakos et al.; U.S. Pat. No. 7,757,836 to Karpinsky et al.; U.S. Pat. No. 8,181,592 to Karpinsky et al.; U.S. Pat. No. 8,359,995 to Bakos et al.; U.S. Pat. No. 9,277,754 to Karpinsky et al.; U.S. Pat. No. 9,370,197 to Karpinsky et al.; U.S. Pat. No. 9,463,935 to Karpinsky et al.; U.S. Pat. No. 9,635,880 to Bakos et al.; U.S. Pat. No. 10,011,426 to Karpinsky et al.; and U.S. Patent Appl'n. Publ'n. 2019/0328028 to Karpinsky et al., as well as the patents cited in (and patents citing to) these references, all of which are incorporated by reference herein such that their contents should be regarded as a part of this document.

Figure 1:
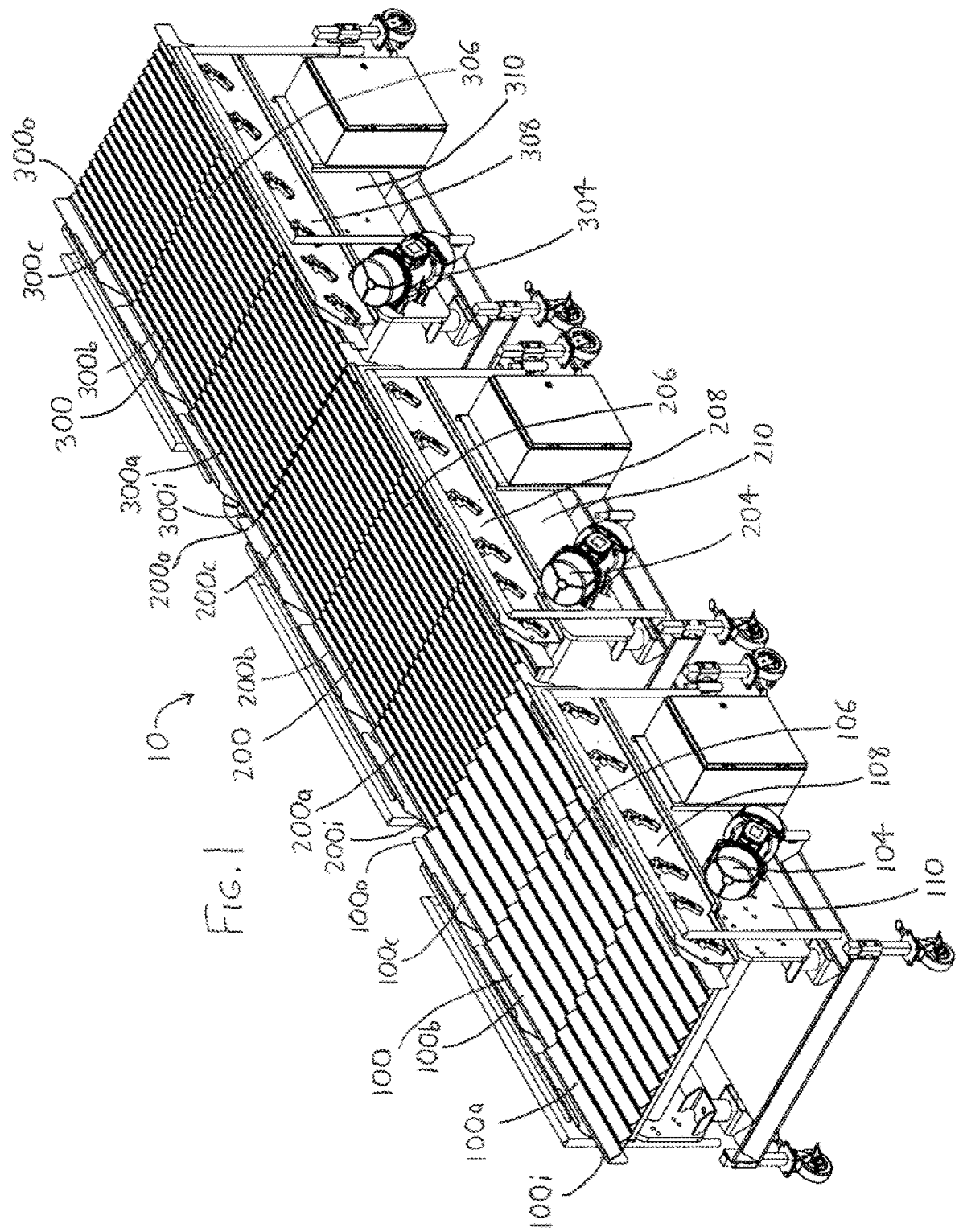
FIG. 1 is a perspective view of a conveyor system 10 exemplifying the invention, having three product transfer pans 100/200/300.
Figure 2:
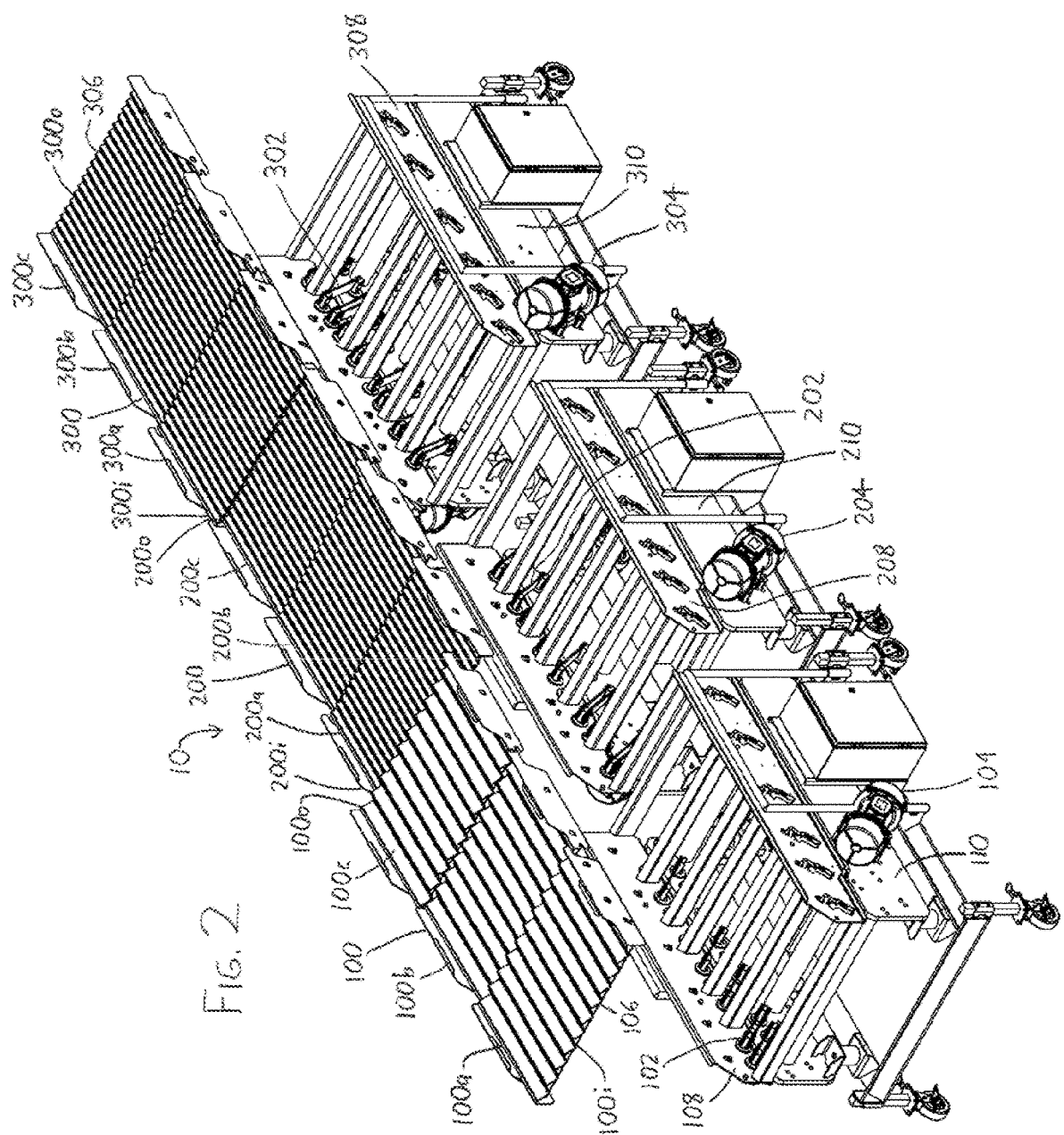
FIG. 2 is a partially exploded (disassembled) view of the conveyor system 10 of FIG. 1, showing the product transfer pans 100/200/300 lifted from their frames 108/208/308, and showing the elongated spring arms 102/202/302 linking each frame 108/208/308 to a respective shaker base 110/210/310 bearing a shaker motor 104/204/304.

As seen in FIG. 2, as the series of product transport pans 100/200/300 progresses from the first pan 100 to the final pan 300, the angles of their spring arms 102/202/302 gradually transition to more vertical orientations, thereby imparting less vertical thrust and motion, and greater horizontal thrust and motion, to the pans 100/200/300. Product entering the first pan 100 will therefore experience greater vertical "bounce," being tossed more forcefully upwardly than on later pans 200 and 300, assisting the product with settling its length within a channel 106. However, the alignment of the products within channels 106 may be "coarse," given the force of the vertical vibration. In subsequent pans 200 and 300, the decreasing vertical thrust/motion has lesser tendency to lift the products from the floor/walls of the channels 206 and 306, tending to more finely align the products lengthwise within the channels 206 and 306 as they settle therein. Moreover, any products that remain straddled across adjacent channels 106 and 206 tend to be dislodged when transitioning between pans 100/200/300, as the products will experience sudden acceleration. This inter-pan acceleration is enhanced by increasing the vibratory frequency/speed of successive pans 100/200/300. A conveyor system such as the one shown in FIGS. 1-2 might use the following arrangement where products such as chicken cutlets are being processed:

Length of each product transport pan 100/200/300: 5-10 feet

| Product Transport Pan | Frequency/Speed (RPM) | Spring Arm Angle (from vertical) |
|---|---|---|
| 100 | 910 | 45 degrees |
| 200 | 925 | 33 degrees |
| 300 | 950 | 22.5 degrees |

The shaker motor 104/204/304 frequency/speed might be increased (or decreased) by as much as 50 RPM, and arm angle might be increased (or decreased) by as much as 5 degrees. However, these ranges are merely exemplary, and other speeds/angles could be used, particularly for different products having different weights, sizes/configurations, plasticity/malleability, and stickiness. It is not necessary that all product transport pans in a series have successively decreasing arm angle (with respect to vertical), increasing vibration distance (i.e., increased thrust along the direction of product travel), and/or increasing vibration frequency/speed; one or more of these characteristics might be maintained unchanged from one product transport pan to the next.

The channels 306 of the final product transport pan 300 are preferably sized at least as large as the nominal width of the product being processed, with each prior transport pan 100 and 200 having the same or fewer channels 106 and 206. The number of channels of the prior pan are preferably an integer divisor of the number of channels of the later pan, e.g., one-half or one-third the number of channels of the later pan, such that products traveling down the channels of the preceding pan are separated/spread into two or more channels in the succeeding pan. Pans 100/200/300 need not have the simple corrugated forms exemplified by the pans 100/200/300, and could have features such as those shown in the patents noted earlier in this document, such as diverging fan-shaped slides (as in U.S. Pat. No. 9,370,197) or diverging channels for spreading products, or conversely converging fan-shaped troughs or converging channels for concentrating product flow (as may be useful at the final product transport pan 300 to concentrate product for receipt on a narrower product throughput path on subsequent processing equipment); vanes, wedges, deflectors, or other shapes which protrude from the pan surfaces to spread or otherwise direct products (as in U.S. Pat. No. 9,463,935); perforations/apertures in pan surfaces (for example, to receive excess particulate or liquid coating material); and/or "stairstepped" pan surfaces for tumbling products (as in U.S. Patent Appl'n. Publ'n. 2019/0328028). Pans 100/200/300 are preferably removably attached to their frames 108/208/308, as by bolts or other fasteners that can be adjusted by tool or by hand, so that pans 100/200/300 can be easily removed from their frames 108/208/308 for easy cleaning, and/or for easy reconfiguration of the conveyor system 10 to accommodate different types of products.

As illustrated by the product transport pans 100/200/300, pans may be provided in multiple pan sections 100a/100b/100c, 200a/200b/200c, and 300a/300b/300c arrayed along the product travel direction (and/or arrayed across the width of the conveyor system 10). Throughout this document, a "product transport pan" can be regarded as containing one or more pan sections, all of which vibrate as a unit. While the product transport pans 100/200/300 of the exemplary conveyor system 10 are depicted as each having identically sized and configured pan sections 100a/100b/100c, 200a/200b/200c, and 300a/300b/300c, the pan sections need not be identically sized or configured. The depicted pan sections 100a/100b/100c, 200a/200b/200c, and 300a/300b/300c are each shown as sloping upwardly between their pan section input ends and their pan section output ends, situating each pan's output end higher than its input end, to slow product travel and allow more time for product alignment within each section's channels. The output ends of the pan sections slightly overhang the pan section input ends of the succeeding pan sections, such that products within a channel of one pan section are passed into the corresponding channel(s) of the succeeding pan section.

Each shaker base 110/210/310 for a product transport pan 100/200/300 can individually mobile (as by bearing lockable casters for ease of portability), or two or more shaker bases 110/210/310 can be provided as a mobile or immobile unit. One or more of the shaker bases 110/210/310 and their product transfer pans 100/200/300 could be incorporated into other processing equipment.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims. In these claims, no element therein should be interpreted as a "means-plus-function" element or a "step-plus-function" element pursuant to 35 U.S.C. § 112(f) unless the words "means for" or "step for" are explicitly used in the particular element in question.

What is claimed is:

1. A conveyor system including:
    A. a first product transfer pan extending between a first pan input end and a first pan output end, with elongated first spring arms linking the first product transfer pan to a first shaker motor, and
    B. a second product transfer pan extending between a second pan input end and a second pan output end, with elongated second spring arms linking the second product transfer pan to a second shaker motor,
    wherein:
    a. the second pan input end is situated adjacent the first pan output end, whereby the second pan input end receives product from the first pan output end,
    b. the first spring arms are aligned at a greater angle to a vertical plane than the second spring arms,
    c. the first product transfer pan is configured to vibrate at a first frequency by a first distance along a product travel direction extending between the first pan input end and the second pan output end,
    d. the second product transfer pan is configured to vibrate at a second frequency by a second distance along the product travel direction, and
    e. the second distance is greater than the first distance.

2. The conveyor system of claim 1 wherein each product transfer pan includes product channels depressed therein, the product channels extending between the pan input end and the pan output end.

3. The conveyor system of claim 2 wherein the second product transfer pan has a greater number of channels than the first transfer pan.

4. The conveyor system of claim 1 wherein the pan output end of the first transfer pan is situated over the second transfer pan.

5. The conveyor system of claim 1 wherein at least one of the transfer pans slopes upwardly between its pan input end and its pan output end, whereby its pan output end is higher than its pan input end.

6. The conveyor system of claim 1 wherein the first pan output end is situated above and overhanging the second pan input end.

7. The conveyor system of claim 1 wherein:
    a. at least one of the product transfer pans is defined by two or more separate pan sections arrayed between the pan input end and the pan output end,
    b. each pan section extends between a pan section input end and a pan section output end, c. each pan section output end is situated adjacent the pan section input end of any successive pan section in the array.

8. The conveyor system of claim 1 wherein:
   a. the first product transfer pan is further configured to vibrate at the first frequency by a first height oriented at least substantially perpendicular to the product travel direction,
   b. the second product transfer pan is configured to vibrate at the second frequency by a second height oriented at least substantially perpendicular to the product travel direction, and
   c. the second height is less than the first height.

9. The conveyor system of claim 1 wherein the second shaker motor is configured to operate at a greater speed than the first shaker motor.

10. A conveyor system including product transfer pans arrayed in series, each product transfer pan:
    a. extending between a pan input end and a pan output end,
    b. having its pan output end situated to provide product to the pan input end of any succeeding product transfer pan in the series,
    c. being linked to a respective shaker motor via respective elongated spring arms,
    wherein at least one product transfer pan has its linked spring arms aligned at a greater angle to a vertical plane than the linked spring arms of one or more of the following product transfer pans in the series.

11. The conveyor system of claim 10 wherein each shaker motor is configured to operate at a greater speed than the shaker motor of any prior product transfer pan in the series.

12. The conveyor system of claim 10 wherein each product transfer pan includes product channels depressed therein, the product channels extending between the pan input end and the pan output end.

13. The conveyor system of claim 12 wherein at least one product transfer pan has a fewer number of channels than one or more of the following product transfer pans in the series.

14. The conveyor system of claim 10 wherein the pan output end of each transfer pan is situated over the pan input end of any following product transfer pan in the series.

15. The conveyor system of claim 10 wherein each transfer pan slopes upwardly between its pan input end and its pan output end, whereby its pan output end is higher than its pan input end.

16. A conveyor system including product transfer pans arrayed in series, each product transfer pan:
    a. extending between a pan input end and a pan output end, wherein each pan input end is situated to receive product from the pan output end of any prior product transfer pan in the series,
    b. being linked by elongated spring arms to a respective shaker motor, wherein the linked spring arms of each product transfer pan are aligned at a greater angle to a vertical plane than the linked spring arms of any succeeding product transfer pan in the series,
    c. being configured to vibrate:
       (1) in a product travel direction extending between the linked product transfer pan's input end and the linked product transfer pan's pan output end,
       (2) by a distance greater than the distance of any linked shaker motor of any prior product transfer pan in the series.

17. The conveyor system of claim 16 wherein:
    a. each product transfer pan has product channels defined therein, the product channels extending between the pan input end and the pan output end,
    b. each product transfer pan has at least the same number of product channels as any prior product transfer pan in the series, and
    c. the final product transfer pan in the series has a greater number of product channels than the first product transfer pan in the series.

18. The conveyor system of claim 16 wherein each product transfer pan slopes upwardly between its pan input end and its pan output end, whereby its pan output end is higher than its pan input end.

19. The conveyor system of claim 16 wherein the second shaker motor of each product transfer pan is configured to operate at a greater speed than the shaker motor of any succeeding product transfer pan in the series.

20. The conveyor system of claim 16 wherein the pan output end of each transfer pan overhangs the pan input end of any following product transfer pan in the series.

* * * * *